(12) United States Patent
Wang (10) Patent No.: US 10,638,145 B2
(45) Date of Patent: Apr. 28, 2020

(54) VIDEO ENCODING APPARATUS AND OPERATING METHOD THEREOF

(71) Applicant: Novatek Microelectronics Corp., Hsinchu (TW)

(72) Inventor: Yu-Min Wang, Hsinchu County (TW)

(73) Assignee: Novatek Microelectronics Corp., Hsinchu (TW)

( * ) Notice: Subject to any disclaimer, the term of this patent is extended or adjusted under 35 U.S.C. 154(b) by 37 days.

(21) Appl. No.: 16/012,748

(22) Filed: Jun. 19, 2018

(65) Prior Publication Data

US 2019/0387239 A1    Dec. 19, 2019

(51) Int. Cl.
| | |
|---|---|
| *H04N 19/426* | (2014.01) |
| *H04N 19/117* | (2014.01) |
| *H04N 19/91* | (2014.01) |
| *H04N 19/124* | (2014.01) |
| *H04N 19/52* | (2014.01) |
| *H04N 19/61* | (2014.01) |

(52) U.S. Cl.
CPC ......... *H04N 19/426* (2014.11); *H04N 19/117* (2014.11); *H04N 19/124* (2014.11); *H04N 19/52* (2014.11); *H04N 19/619* (2014.11); *H04N 19/91* (2014.11)

(58) Field of Classification Search
CPC .. H04N 19/426; H04N 19/117; H04N 19/124; H04N 19/52; H04N 19/619; H04N 19/91
USPC .................................................. 375/240.03
See application file for complete search history.

(56) References Cited

U.S. PATENT DOCUMENTS

| | | | | |
|---|---|---|---|---|
| 2006/0146939 | A1* | 7/2006 | Wang ................... | H04N 19/176 375/240.24 |
| 2011/0249748 | A1* | 10/2011 | Zan ....................... | H04N 19/105 375/240.16 |
| 2014/0192884 | A1* | 7/2014 | Laroche ............... | H04N 19/105 375/240.16 |

OTHER PUBLICATIONS

Norkin et al., "HEVC Deblocking Filter," IEEE Transactions on Circuits and Systems for Video Technology, vol. 22, No. 12, XPO011487156, pp. 1746-1754, Institute of Electrical and Electronics Engineers, New York, New York (Dec. 2012).*

* cited by examiner

*Primary Examiner* — Patricia I Young
(74) *Attorney, Agent, or Firm* — JCIPRNET (57) ABSTRACT

A video encoding apparatus and an operating method thereof are provided. The video encoding apparatus includes an encoding circuit, a reconstructed frame generating circuit, a deblocking filter and a determination circuit. The encoding circuit generates encoded data according to a residual frame and generates a reconstructed residual frame. The reconstructed frame generating circuit generates a first reconstructed frame according to the reconstructed residual frame and a predicted frame. The deblocking filter generates a second reconstructed frame by eliminating discontinuities in reconstructed blocks of the first reconstructed frame. The current reconstructed block is not output to the memory when a current reconstructed block is identical to a co-located reference block of a reference frame stored in the memory. The current reconstructed block is output to the memory when the current reconstructed block is different from the co-located reference block in the reference frame.

17 Claims, 4 Drawing Sheets

VIDEO ENCODING APPARATUS AND OPERATING METHOD THEREOF

BACKGROUND

Field of the Invention

The invention relates to a video apparatus and more particularly to a video encoding apparatus and an operating method thereof.

Description of Related Art

Generally, a video encoder of a video apparatus performs video encoding on a video frame for transmission and/or storage. During an encoding process, a general video encoder may perform motion compensation on the video frame by using a reference frame to obtain a predicted frame. The video encoder may generate encoded data according to the video frame and the predicted frame. During the process of generating the encoded data, a reference frame buffer is required to provide the reference frame. Besides, the general video encoder may further generate a reconstructed frame with respect to the encoded data. During the process of generating the reconstructed frame, another frame buffer is required for storing the reconstructed frame.

The general video encoder is required to corporate with individual memory spaces as frame buffers for storing the reference frame and the reconstructed frame. As resolution increases, memory size increases and the cost of the memory increases. Besides, the demand of memory access bandwidth is also indispensable for the general video encoder.

SUMMARY

The invention provides a video encoding apparatus and an operating method thereof which can reduce demands for the memory space and/or demands for the memory access bandwidths.

According to an embodiment of the invention, a video encoding apparatus is provided. The video encoding apparatus includes an encoding circuit, a reconstructed frame generating circuit, a deblocking filter and a determination circuit. The encoding circuit generates encoded data with respect to an input frame according to a residual frame which is a difference between the input frame and a predicted frame and generates a reconstructed residual frame. The reconstructed frame generating circuit is coupled to the encoding circuit. The reconstructed frame generating circuit generates a first reconstructed frame according to the reconstructed residual frame and a predicted frame. The deblocking filter is coupled to the reconstructed frame generating circuit. The deblocking filter generates a second reconstructed frame by eliminating discontinuities in a plurality of reconstructed blocks of the first reconstructed frame. The determination circuit determines whether to output each of reconstructed blocks of the second reconstructed frame to a memory. The determination circuit controls a current reconstructed block in the second reconstructed frame not to be output to the memory when the current reconstructed block is determined as identical to a co-located reference block of a reference frame stored in the memory. The determination circuit controls the current reconstructed block to be output to the memory when the current reconstructed block is determined as different from the co-located reference block in the reference frame, wherein a location of the current reconstructed block in the second reconstructed frame is identical to a location of the co-located reference block in the reference frame.

According to an embodiment of the invention, an operation method of a video encoding apparatus is provided. The operating method includes: by an encoding circuit, generating encoded data with respect to an input frame according to a residual frame which is a difference between the input frame and a predicted frame and generating a reconstructed residual frame; by a reconstructed frame, generating a first reconstructed frame according to the reconstructed residual frame and the predicted frame; by deblocking filter, generating a second reconstructed frame by eliminating discontinuities in a plurality of reconstructed blocks of the first reconstructed frame; and by the determination circuit, determining whether to output each of the reconstructed blocks of the second reconstructed frame to a memory. A current reconstructed block in the second reconstructed frame is controlled by the determination circuit not to be output to the memory when the current reconstructed block is determined as identical to a co-located reference block of a reference frame stored in the memory. The current reconstructed block is controlled by the determination circuit to be output to the memory when the current reconstructed block is determined as different from the co-located reference block in the reference frame, wherein a location of the current reconstructed block in the second reconstructed frame is identical to a location of the co-located reference block in the reference frame.

To sum up, the video encoding apparatus and the operating method of the embodiments of the invention may compare the current reconstructed block in the second reconstructed frame with the co-located reference block in the reference frame stored in the memory. When the current reconstructed block is identical to the co-located reference block stored in the memory, the video encoding apparatus does not output the current reconstructed block to the memory. Thereby, the video encoding apparatus can reduce demands for the memory access bandwidths. Moreover, the reconstructed frame and the reference frame can share the same memory space, and thus, the video encoding apparatus can reduce demands for the memory space.

To make the above features and advantages of the invention more comprehensible, embodiments accompanied with drawings are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

The term "couple (or connect)" herein (including the claims) are used broadly and encompass direct and indirect connection or coupling means. For example, if the disclosure describes a first apparatus being coupled (or connected) to a second apparatus, then it should be interpreted that the first apparatus can be directly connected to the second apparatus, or the first apparatus can be indirectly connected to the second apparatus through other devices or by a certain coupling means. Moreover, elements/components/steps with same reference numerals represent same or similar parts in the drawings and embodiments. Elements/components/notations with the same reference numerals in different embodiments may be referenced to the related description.

Figure 1:
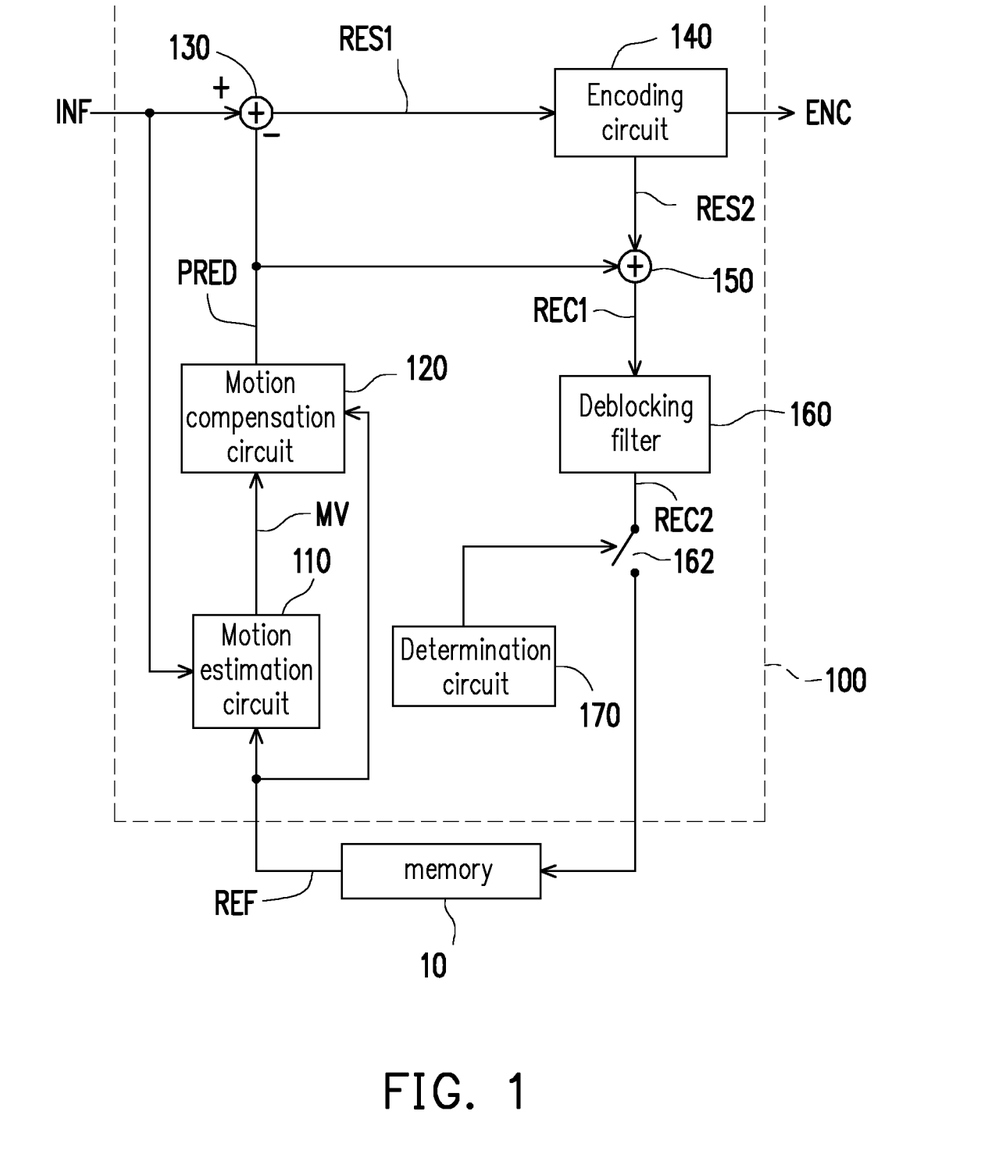
FIG. 1 is a schematic circuit block diagram illustrating a video encoding apparatus according to an embodiment of the invention.

FIG. 1 is a schematic circuit block diagram illustrating a video encoding apparatus 100 according to an embodiment of the invention. In the embodiment illustrated in FIG. 1, the video encoding apparatus 100 includes a motion estimation circuit 110, a motion compensation circuit 120 and a residual frame generating circuit 130. The motion estimation circuit 110 may receive a reference frame REF from a memory 10 and receive an input frame INF from a previous-stage circuit (not shown) outside the video encoding apparatus 100. According to the reference frame REF, the motion estimation circuit 110 may estimate a motion vector of each block in the input frame INF, so as to generate a plurality of motion vectors MV respectively corresponding to a plurality of blocks of the input frame INF. It is noted that a block may be a macroblock as defined in AVC (Advanced video coding)/H.264, or a coding tree unit as defined in HEVC (High Efficiency Video Coding)/H.265. The implementation manner of the motion estimation circuit 110 is not limited in the present embodiment. For instance, in some embodiments, the motion estimation circuit 110 may be a conventional motion estimation circuit or any other motion estimation circuit/element.

The motion compensation circuit 120 is coupled to the motion estimation circuit 110 to receive the motion vectors MV. The motion compensation circuit 120 may receive the reference frame REF from the memory 10. According to the motion vectors MV and the reference frame REF, the motion compensation circuit 120 may generate a predicted frame PRED. The implementation manner of the motion compensation circuit 120 is not limited in the present embodiment. For instance, in some embodiments, the motion compensation circuit 120 may be a conventional compensation estimation circuit or any other motion compensation circuit/element.

The residual frame generating circuit 130 is coupled to the motion compensation circuit 120 to receive the predicted frame PRED. The residual frame generating circuit 130 may receive the input frame INF from the previous-stage circuit (not shown) outside the video encoding apparatus 100. The residual frame generating circuit 130 may calculate a difference between the input frame INF and the predicted frame PRED and generate a residual frame RES1 according to the difference. The implementation manner of the residual frame generating circuit 130 is not limited in the present embodiment. For instance, in some embodiments, the residual frame generating circuit 130 may be a conventional residual frame generating circuit or any other residual frame generating circuit/element.

In the embodiment illustrated in FIG. 1, the video encoding apparatus 100 further includes an encoding circuit 140, a reconstructed frame generating circuit 150, a deblocking filter 160 and a determination circuit 170. The encoding circuit 140 is coupled to the residual frame generating circuit 130 to receive the residual frame RES1. The encoding circuit 140 may generate encoded data ENC with respect to the input frame INF according to the residual frame RES1 and generate a reconstructed residual frame RES2. The implementation manner of the encoding circuit 140 can be referred to FIG. 3 and is not limited in the present embodiment. For instance, in some embodiments, the encoding circuit 140 may be a conventional encoding circuit or any other encoding circuit/element.

The reconstructed frame generating circuit 150 is coupled to the encoding circuit 140 to receive the reconstructed residual frame RES2. The reconstructed frame generating circuit 150 is further coupled to the motion compensation circuit 120 to receive the predicted frame PRED. The reconstructed frame generating circuit 150 may generate a first reconstructed frame REC1 according to the reconstructed residual frame RES2 and the predicted frame PRED. The implementation manner of the reconstructed frame generating circuit 150 is not limited in the present embodiment. For instance, in some embodiments, the reconstructed frame generating circuit 150 may be a conventional reconstructed frame generating circuit or any other reconstructed frame generating circuit/element.

The deblocking filter 160 is coupled to the reconstructed frame generating circuit 150 to receive the first reconstructed frame REC1. By eliminating discontinuities in a plurality of reconstructed blocks of the first reconstructed frame REC1, the deblocking filter 160 may generate a second reconstructed frame REC2. A switch 162 is coupled between an output terminal of the deblocking filter 160 and the memory 10 and the on/off state of the switch 162 is controlled by the determination circuit 170. The determination circuit 170 may determine whether to output each of reconstructed blocks of the second reconstructed frame REC2 to the memory 10. For instance, when a current reconstructed block in the second reconstructed frame REC2 is determined as identical to a co-located reference block in the reference frame REF stored in the memory 10, the determination circuit 170 may control the current reconstructed block not to be output to the memory 10, by turning off the switch 162. When the current reconstructed block is determined as different from the co-located reference block stored in the memory 10, the determination circuit 170 may control the current reconstructed block to be output to the memory 10, by turning on the switch 162. A location of the current reconstructed block in the second reconstructed frame REC2 is identical to a location of the co-located reference block in the reference frame REF. The implementation manner of the deblocking filter 160 is not limited in the present embodiment. The deblocking filter 160 may be a conventional deblocking filter or any other deblocking filter.

Figure 2:
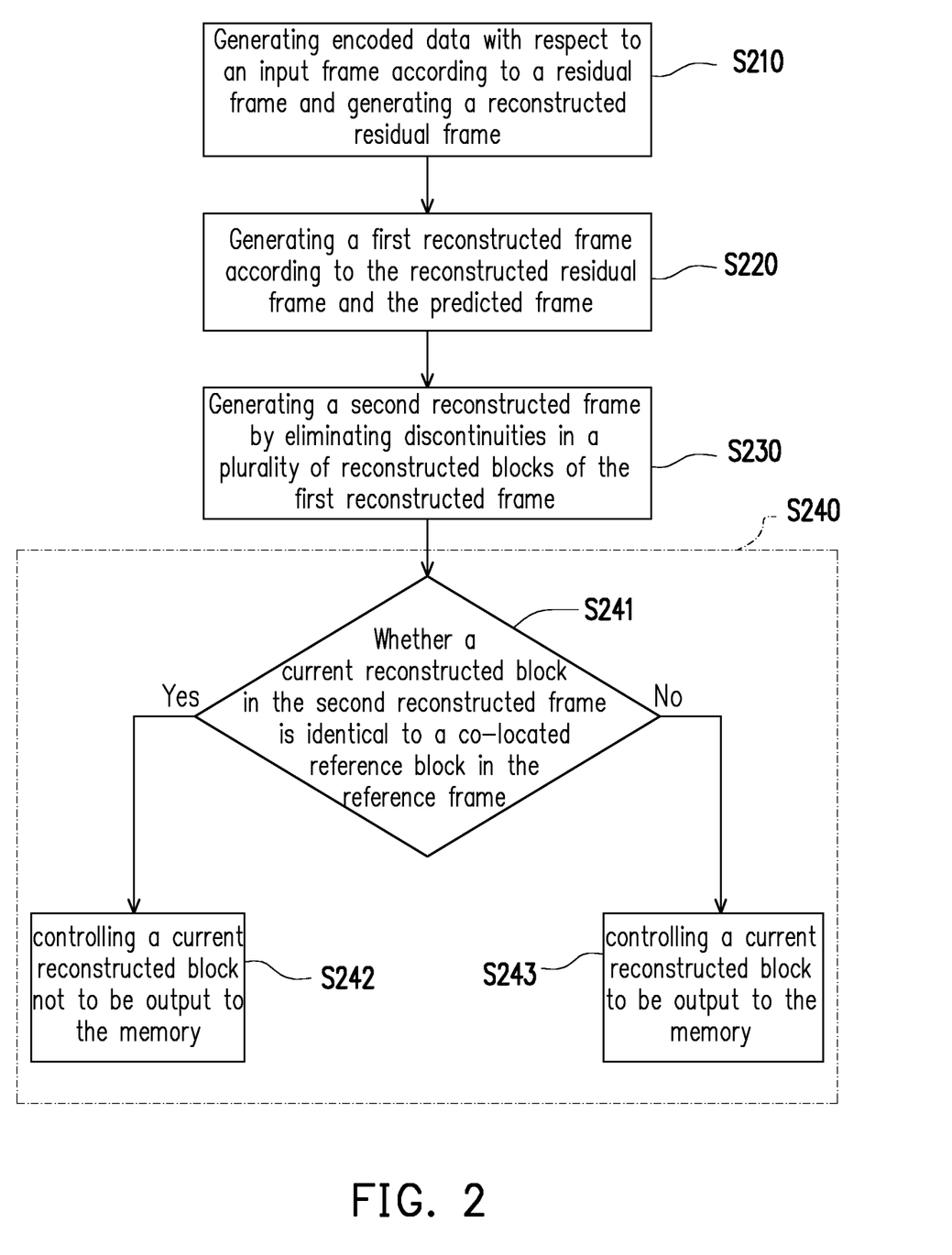
FIG. 2 is a flowchart illustrating an operation method of a video encoding apparatus according to an embodiment of the invention.

It is noted that the switch 162 in FIG. 1 is one of examples to realize the control to output the second reconstructed frame REC2 or not, and there are other ways to realize such a control scheme. In another example, the switch 162 may be not required and the determination circuit 170 may set a flag which has a value indicating that the current reconstructed block of the second reconstructed frame REC2 is identical to or different from the co-located reference block in the reference frame REF stored in the memory 10. The deblocking filter 160 may read the flag so as to decide whether to output the current reconstructed block or not. FIG. 2 is a flowchart illustrating an operation method of a video encoding apparatus according to an embodiment of the invention. Referring to FIG. 1 and FIG. 2, in step S210, the encoding circuit 140 may generate encoded data ENC with respect to an input frame INF according to a residual frame RES1 which is a difference between the input frame INF and a predicted frame PRED and generate a reconstructed residual frame RES2. In step S220, the reconstructed frame generating circuit 150 may generate a first reconstructed frame REC1 according to the reconstructed residual frame RES2 and a predicted frame PRED. In step S230, the deblocking filter 160 may generate a second reconstructed frame REC2 by eliminating discontinuities in a plurality of reconstructed blocks of the first reconstructed frame REC1. In step S240, the determination circuit 170 may determine whether to output each of reconstructed blocks of the second reconstructed frame REC2 to the memory 10.

In the embodiment illustrated in FIG. 2, step 240 includes steps S241, S242 and S243. In step S241, the determination circuit 170 may determine whether a current reconstructed block in the second reconstructed frame REC2 is identical to a co-located reference block in the reference frame REF stored in the memory 10. When the current reconstructed block in the second reconstructed frame REC2 is determined as identical to the co-located reference block in the reference frame REF stored in the memory 10 (i.e., the determination result of step S241 is "Yes"), the determination circuit 170, in step S242, may control the current reconstructed block not to be output to the memory 10. Thereby, the video encoding apparatus 100 may reduce demands for access bandwidths to the memory 10.

When the current reconstructed block in the second reconstructed frame REC2 is determined as different from the co-located reference block in the reference frame REF stored in the memory 10 (i.e., the determination result of step S241 is "No"), the determination circuit 170, in step S243, may control the current reconstructed block to be output to the memory 10. The current reconstructed block in the second reconstructed frame REC2 is written into the memory 10. In an embodiment, the current reconstructed block in the second reconstructed frame REC2 may be written into a dedicate memory space different from a memory space dedicate for storing the reference frame. In another embodiment, the current reconstructed block in the second reconstructed frame REC2 may overwrite the co-located reference block in the reference frame REF in the memory 10, such that the reconstructed frame and the reference frame may share the same memory space (used as a frame buffer) in the memory. Thus, the video encoding apparatus 100 may reduce demands for the memory space.

Figure 3:
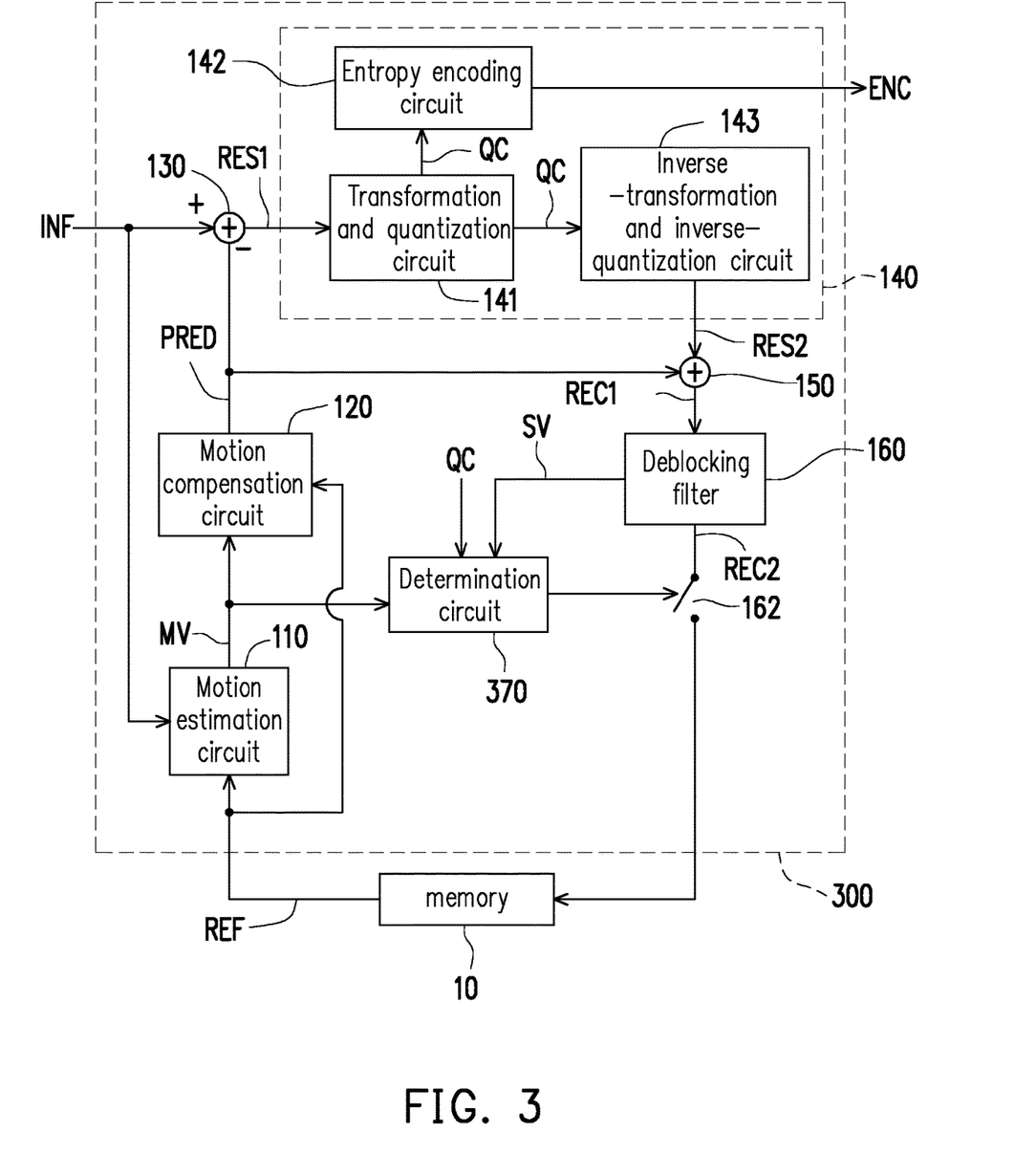
FIG. 3 is a schematic circuit block diagram illustrating a video encoding apparatus according to an embodiment of the invention.

FIG. 3 is a schematic circuit block diagram illustrating a video encoding apparatus 300 according to an embodiment of the invention. In the embodiment illustrated in FIG. 3, the video encoding apparatus 300 includes the motion estimation circuit 110, the motion compensation circuit 120, the residual frame generating circuit 130, the encoding circuit 140, the reconstructed frame generating circuit 150, the deblocking filter 160, a switch 162, and a determination circuit 370. Some of these circuits having reference numerals same as circuits in FIG. 1 can be referred to the description of FIG. 1 and not repeated herein. In the embodiment illustrated in FIG. 3, the encoding circuit 140 includes a transformation and quantization circuit 141, an entropy encoding circuit 142 and an inverse-transformation and inverse-quantization circuit 143. The transformation and quantization circuit 141 is coupled to the residual frame generating circuit 130 to receive the residual frame RES1. The transformation and quantization circuit 141 may perform frequency transformation on a residual block of the residual frame RES1 corresponding to a current block to be encoded in the input frame INF to generate a plurality of coefficients. The transformation and quantization circuit 141 may further perform quantization on the coefficients to generate a plurality of quantized coefficients QC. The implementation manner of the transformation and quantization circuit 141 is not limited in the present embodiment. For instance, in some embodiments, the transformation and quantization circuit 141 may be a conventional transformation and quantization circuit or any other transformation and quantization circuit/element.

The entropy encoding circuit 142 is coupled to the transformation and quantization circuit 141 to receive the quantized coefficients QC. The entropy encoding circuit 142 may perform entropy coding on the quantized coefficients QC to generate the encoded data ENC corresponding to the current block to be encoded. The implementation manner of the entropy encoding circuit 142 is not limited in the present embodiment. For instance, in some embodiments, the encoding circuit 142 may be a conventional encoding circuit or any other encoding circuit/element.

The inverse-transformation and inverse-quantization circuit 143 is coupled to the transformation and quantization circuit 141 to receive the quantized coefficients QC. The inverse-transformation and inverse-quantization circuit 143 may perform inverse-quantization on the quantized coefficients QC to generate a plurality of de-quantized coefficients. The inverse-transformation and inverse-quantization circuit 143 may perform inverse-transformation on the de-quantized coefficients and generate a reconstructed residual block of the reconstructed residual frame RES2. The implementation manner of the inverse-transformation and inverse-quantization circuit 143 is not limited in the present embodiment. For instance, in some embodiments, the inverse-transformation and inverse-quantization circuit 143 may be a conventional inverse-transformation and inverse-quantization circuit or any other inverse-transformation and inverse-quantization circuit/element.

In the embodiment illustrated in FIG. 3, the determination circuit 370 is coupled to the motion estimation circuit 110 to receive one of the motion vectors MV corresponding to the current block to be encoded in the input frame INF. The determination circuit 370 is further coupled to the transformation and quantization circuit 141 to receive the quantized coefficients QC corresponding to the current block to be encoded in the input frame INF. The determination circuit 370 is further coupled to the deblocking filter 160 to receive a status value SV. The status value SV may indicate whether a current reconstructed block in the second reconstructed frame REC2 is identical to a co-located reconstructed block in the first reconstructed frame REC1. A location of the co-located reconstructed block in the first reconstructed frame REC1 is identical to a location of the current reconstructed block in the second reconstructed frame REC2.

According to the motion vectors MV provided by the motion estimation circuit 110, the determination circuit 370 may determine whether the motion vector MV corresponding to the current block to be encoded is a zero vector. According to the quantized coefficients QC provided by the transformation and quantization circuit 141, the determination circuit 370 may determine whether a plurality of quantized coefficients QC corresponding to the current block to be encoded are zero. According to the status value SV provided by the deblocking filter 160, the determination circuit 370 may determine whether the current reconstructed block in the second reconstructed frame REC2 is identical to the co-located reconstructed block in the first reconstructed frame REC1. When the motion vector MV corresponding to the current block to be encoded is determined as the zero vector, the quantized coefficients QC corresponding to the current block to be encoded are determined as zero, and the current reconstructed block in the second reconstructed frame REC2 is determined as identical to the co-located reconstructed block in the first reconstructed frame REC1, the determination circuit 370 may determine the current reconstructed block in the second reconstructed frame REC2 as identical to the co-located reference block in the reference frame REF stored in the memory 10.

The determination circuit 370 may control each of reconstructed blocks of the second reconstructed frame REC2 to be output or not be output to the memory 10 according to a result indicating the current reconstructed block in the second reconstructed frame REC2 is identical to or different from the co-located reference block in the reference frame REF stored in the memory 10. When the current reconstructed block in the second reconstructed frame REC2 is determined as identical to the co-located reference block in the reference frame REF, the determination circuit 370 may control the current reconstructed block not to be output to the memory 10, by turning off the switch 162. When the current reconstructed block is determined as different from the co-located reference block, the determination circuit 370 may control the current reconstructed block to be output to the memory 10, by turning on the switch 162.

Figure 4:
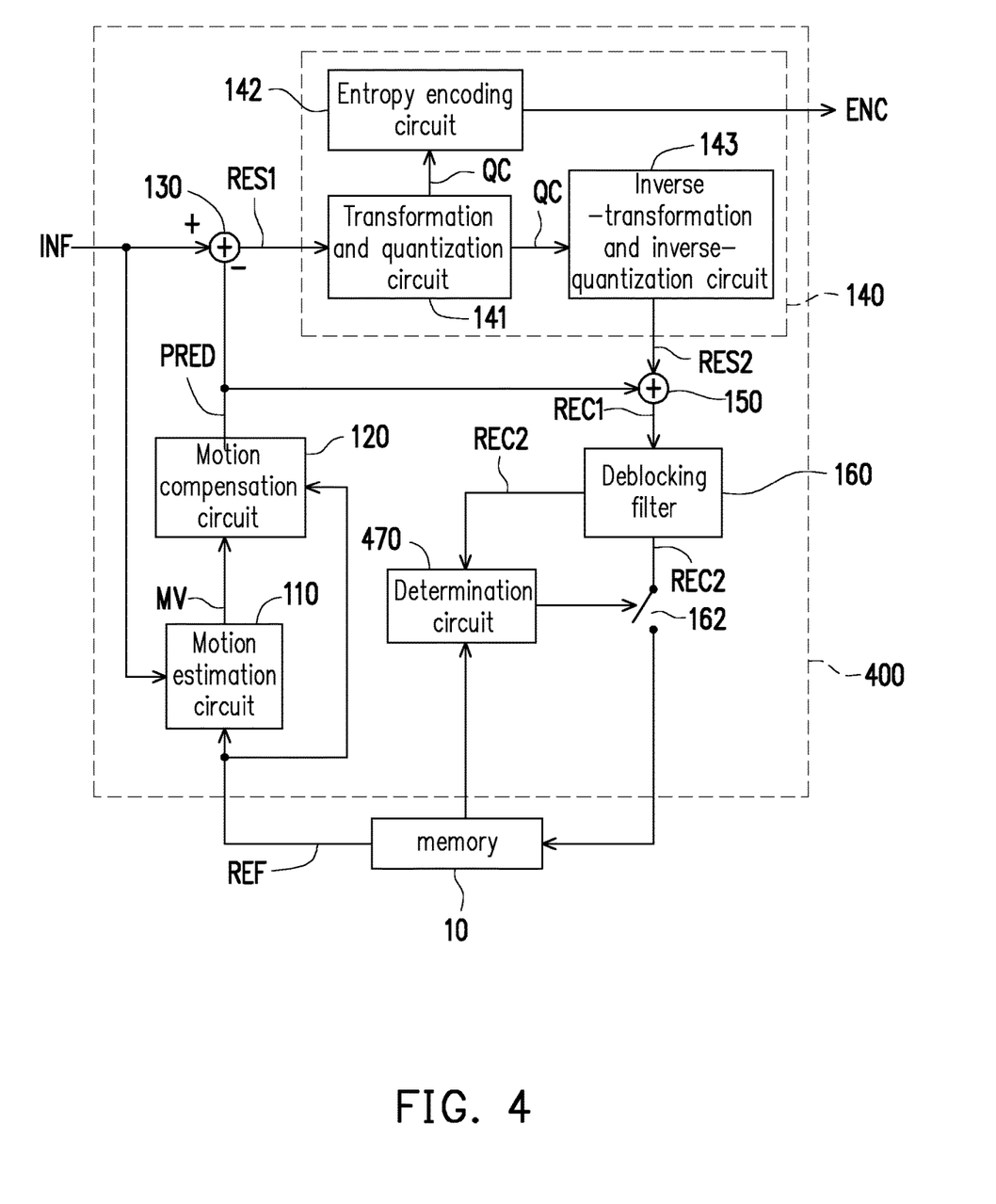
FIG. 4 is a schematic circuit block diagram illustrating a video encoding apparatus according to another embodiment of the invention.

FIG. 4 is a schematic circuit block diagram illustrating a video encoding apparatus 400 according to another embodiment of the invention. In the embodiment illustrated in FIG. 4, the video encoding apparatus 400 includes the motion estimation circuit 110, the motion compensation circuit 120, the residual frame generating circuit 130, the encoding circuit 140, the reconstructed frame generating circuit 150, the deblocking filter 160, a switch 162, and a determination circuit 470. Some of these circuits having reference numerals same as circuits in FIG. 1 and FIG. 3 can be referred to the description of FIG. 1 and FIG. 3 and not repeated herein. In the embodiment illustrated in FIG. 4, the determination circuit 470 is coupled to the deblocking filter 160 to receive the second reconstructed frame REC2. The determination circuit 470 is further coupled to the memory 10 to receive the reference frame REF. The determination circuit 470 may compare pixel data of each pixel of a current reconstructed block in the second reconstructed frame REC2 with pixel data of each pixel of a co-located reference block in the reference frame REF. Based on a design requirement, the pixel data may be expressed by any color space. For instance, the pixel data may be presented in a YUV color space or any other color space. When the pixel data of each pixel of the current reconstructed block in the second reconstructed frame REC2 is determined as identical to the pixel data of each pixel of the co-located reference block in the reference frame REF, the determination circuit 470 may determine the current reconstructed block in the second reconstructed frame REC2 as identical to the co-located reference block in the reference frame REF. When the pixel data of each pixel of the current reconstructed block in the second reconstructed frame REC2 is determined as different from the pixel data of each pixel of the co-located reference block in the reference frame REF, the determination circuit 470 may determine the current reconstructed block in the second reconstructed frame REC2 as different from the co-located reference block in the reference frame REF.

The determination circuit 470 may control each of reconstructed blocks of the second reconstructed frame REC2 to be output or not be output to the memory 10 according to a comparison result of comparing pixel data of each pixel of a current reconstructed block in the second reconstructed frame REC2 with pixel data of each pixel of the co-located reference block in the reference frame REF. The determination circuit 470 may control the current reconstructed block to be output or not to be output to the memory 10, by turning on or turning off the switch 162.

In the above embodiments, the blocks of the motion estimation circuit 110, the motion compensation circuit 120, the residual frame generating circuit 130, the encoding circuit 140, the reconstructed frame generating circuit 150, the deblocking filter 160, the switch 162, and/or the determination circuit 170, 370 or 470 may be implemented logic circuits (i.e., hardware), firmware, software (i.e., program codes), or these above in combination. The hardware logic circuits may be implemented by hardware description languages, e.g., Verilog HDL or VHDL, or other suitable programming languages. In terms of the hardware implementation, one or more controllers, micro-controllers, Application-specific integrated circuits (ASICs), digital signal processors (DSPs), field programmable gate arrays (FPGAs) and/or other various logic blocks, modules and circuits in other processing units may be employed to implement or execute the aforementioned functions of the embodiments of the invention. The program codes may be implemented by using general purpose programming languages (e.g., C or C++) or other suitable programming language and stored in a non-transitory computer readable medium. The program codes may be accessed by a computer or a central processing unit.

Based on the above, the video encoding apparatus and the operating method of the embodiments of the invention can compare the current reconstructed block in the second reconstructed frame with the co-located reference block in the reference frame stored in the memory. The video encoding apparatus 100 does not output the current reconstructed block to the memory when the current reconstructed block is identical to the co-located reference block stored in the memory. Thereby, the video encoding apparatus can reduce the demands for the memory access bandwidths. Moreover, the reconstructed frame and the reference frame can share the same memory space, and thus, the video encoding apparatus can reduce the demands for the memory space.

Although the invention has been disclosed by the above embodiments, they are not intended to limit the invention. It will be apparent to one of ordinary skill in the art that modifications and variations to the invention may be made without departing from the spirit and scope of the invention. Therefore, the scope of the invention will be defined by the appended claims.

What is claimed is:

1. A video encoding apparatus, comprising:
an encoding circuit, configured to generate encoded data with respect to an input frame according to a residual frame which is a difference between the input frame and a predicted frame and generate a reconstructed residual frame;
a reconstructed frame generating circuit, coupled to the encoding circuit, and configured to generate a first reconstructed frame according to the reconstructed residual frame and the predicted frame;
a deblocking filter, coupled to the reconstructed frame generating circuit, and configured to generate a second reconstructed frame by eliminating discontinuities in a plurality of reconstructed blocks of the first reconstructed frame; and a determination circuit, configured to determine whether to output each of reconstructed blocks of the second reconstructed frame to a memory, control a current reconstructed block in the second reconstructed frame not to be output to the memory when the current reconstructed block is determined as identical to a co-located reference block of a reference frame stored in the memory and control the current reconstructed block to be output to the memory when the current reconstructed block is determined as different from the co-located reference block in the reference frame, wherein a location of the current reconstructed block in the second reconstructed frame is identical to a location of the co-located reference block in the reference frame, wherein the determination circuit determines the current reconstructed block in the second reconstructed frame as identical to the co-located reference block in the reference frame when the motion vector corresponding to a current block to be encoded is determined as a zero vector, a plurality of quantized coefficients corresponding to the current block to be encoded are determined as zero, and the current reconstructed block in the second reconstructed frame is determined as identical to the co-located reconstructed block in the first reconstructed frame.

2. The video encoding apparatus according to claim 1, wherein the determination circuit is configured to compare pixel data of each pixel of the current reconstructed block in the second reconstructed frame with pixel data of each pixel of the co-located reference block in the reference frame.

3. The video encoding apparatus according to claim 2, wherein the determination circuit determines the current reconstructed block in the second reconstructed frame as identical to the co-located reference block in the reference frame when the pixel data of each pixel of the current reconstructed block in the second reconstructed frame is determined as identical to the pixel data of each pixel of the co-located reference block in the reference frame.

4. The video encoding apparatus according to claim 1, further comprising:
a motion estimation circuit, configured to receive the input frame and the reference frame and generate a plurality of motion vectors respectively corresponding to a plurality of blocks of the input frame;
a motion compensation circuit, coupled to the motion estimation circuit, and configured to receive the reference frame and generate the predicted frame based on the motion vectors and the reference frame; and
a residual frame generating circuit, coupled to the motion compensation circuit and the encoding circuit, and configured to generate the residual frame which is the difference between the input frame and the predicted frame.

5. The video encoding apparatus according to claim 1, wherein the encoding circuit comprises:
a transformation and quantization circuit, coupled to a residual frame generating circuit, and configured to perform frequency transformation on a residual block of the residual frame corresponding to the current block to be encoded in the input frame to generate a plurality of coefficients and perform quantization on the coefficients to generate the quantized coefficients;
an entropy encoding circuit, coupled to the transformation and quantization circuit, and configured to perform entropy encoding on the quantized coefficients to generate encoded data corresponding to the current block to be encoded; and
an inverse-transformation and inverse-quantization circuit, coupled to the transformation and quantization circuit, and configured to perform inverse-quantization on the quantized coefficients to generate a plurality of de-quantized coefficients and perform inverse-transformation on the de-quantized coefficients to generate a reconstructed residual block of the reconstructed residual frame.

6. The video encoding apparatus according to claim 4, wherein the determination circuit is coupled to the motion estimation circuit to receive one of the motion vectors corresponding to the current block to be encoded in the input frame.

7. The video encoding apparatus according to claim 5, wherein the determination circuit is coupled to the transformation and quantization circuit to receive the quantized coefficients corresponding to the current block to be encoded.

8. The video encoding apparatus according to claim 1, wherein the determination circuit is coupled to the deblocking filter to receive a status value indicating whether the current reconstructed block in the second reconstructed frame is identical to a co-located reconstructed block in the first reconstructed frame which is at the same location as the current reconstructed block.

9. The video encoding apparatus according to claim 1, wherein the current reconstructed block is written into the memory to overwrite the co-located reference block in the reference frame in the memory.

10. An operating method of a video encoding apparatus, comprising:
by an encoding circuit, generating encoded data with respect to an input frame according to a residual frame which is a difference between the input frame and a predicted frame and generating a reconstructed residual frame;
by a reconstructed frame, generating a first reconstructed frame according to the reconstructed residual frame and the predicted frame;
by a deblocking filter, generating a second reconstructed frame by eliminating discontinuities in a plurality of reconstructed blocks of the first reconstructed frame;
by a determination circuit, determining whether to output each of reconstructed blocks of the second reconstructed frame to a memory, wherein determining whether to output each of the reconstructed blocks of the second reconstructed frame to the memory comprises:
controlling a current reconstructed block in the second reconstructed frame not to be output to the memory when the current reconstructed block is determined as identical to a co-located reference block of a reference frame stored in the memory, and
controlling the current reconstructed block to be output to the memory when the current reconstructed block is determined as different from the co-located reference block in the reference frame; and
by the determination circuit, determining the current reconstructed block in the second reconstructed frame as identical to the co-located reference block in the reference frame when the motion vector corresponding to a current block to be encoded is determined as a zero vector, a plurality of quantized coefficients corresponding to the current block to be encoded are determined as zero, and the current reconstructed block in the second reconstructed frame is determined as identical to the co-located reconstructed block in the first reconstructed frame, wherein a location of the current reconstructed block in the second reconstructed frame is identical to a location of the co-located reference block in the reference frame.

11. The operating method according to the claim 10, further comprising:

by the determination circuit, comparing pixel data of each pixel of the current reconstructed block in the second reconstructed frame with pixel data of each pixel of the co-located reference block in the reference frame.

12. The operating method according to the claim 10, further comprising:

by the determination circuit, determining whether the current reconstructed block in the second reconstructed frame is identical to the co-located reference block in the reference frame when the pixel data of each pixel of the current reconstructed block in the second reconstructed frame is determined as identical to the pixel data of each pixel of the co-located reference block in the reference frame.

13. The operating method according to the claim 10, further comprising:

by a motion estimation circuit, receiving the input frame and the reference frame and generating a plurality of motion vectors respectively corresponding to a plurality of blocks of the input frame;

by a motion compensation circuit, receiving the reference frame and generating the predicted frame based on the motion vectors and the reference frame; and by a residual frame generating circuit, generating the residual frame which is the difference between the input frame and the predicted frame.

14. The operating method according to the claim 10, further comprising:

by a transformation and quantization circuit, performing frequency transformation on a residual block of the residual frame corresponding to the current block to be encoded in the input frame to generate a plurality of coefficients and performing quantization on the coefficients to generate the quantized coefficients;

by an entropy coding circuit, performing entropy encoding on the quantized coefficients to generate encoded data corresponding to the current block to be encoded; and by an inverse-transformation and inverse-quantization circuit, performing inverse-quantization on the quantized coefficients to generate a plurality of de-quantized coefficients and performing inverse-transformation on the de-quantized coefficients to generate a reconstructed residual block of the reconstructed residual frame.

15. The operation method according to claim 13, wherein the determination circuit receives one of the motion vectors corresponding to the current block to be encoded in the input frame.

16. The operation method according to claim 14, wherein the determination circuit receives the quantized coefficients corresponding to the current block to be encoded.

17. The operation method according to claim 10, wherein the determination circuit receives a status value indicating whether the current reconstructed block in the second reconstructed frame is identical to a co-located reconstructed block in the first reconstructed frame which is at the same location as the current reconstructed block.

* * * * *